Figure 1:
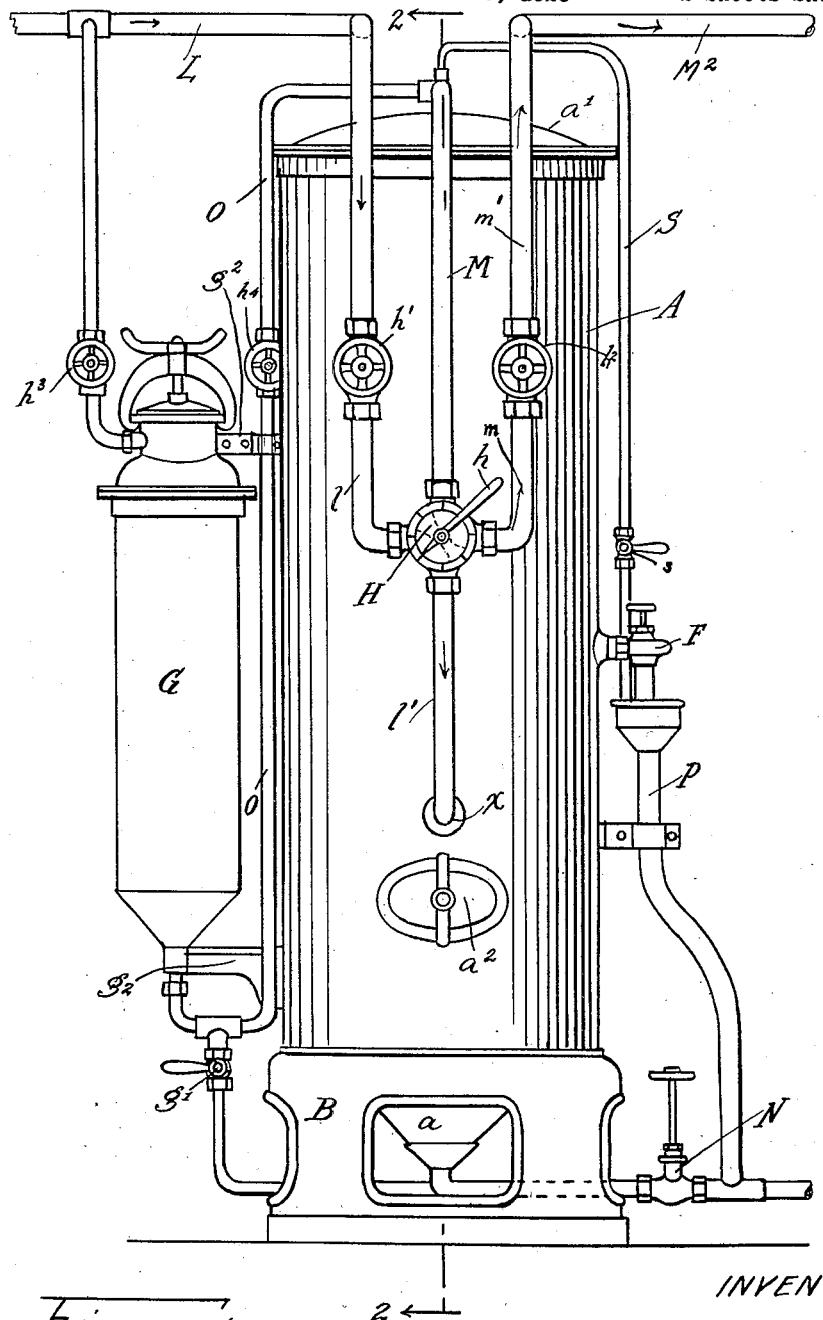

July 3, 1928.

A. NEUMANN 1,675,860

APPARATUS FOR SOFTENING WATER

Filed Dec. 20, 1923    2 Sheets-Sheet 1

INVENTOR:
August Neumann
BY Walter A. Knight
ATTORNEY.

July 3, 1928.
A. NEUMANN
APPARATUS FOR SOFTENING WATER
Filed Dec. 20, 1923
1,675,860
2 Sheets-Sheet 2
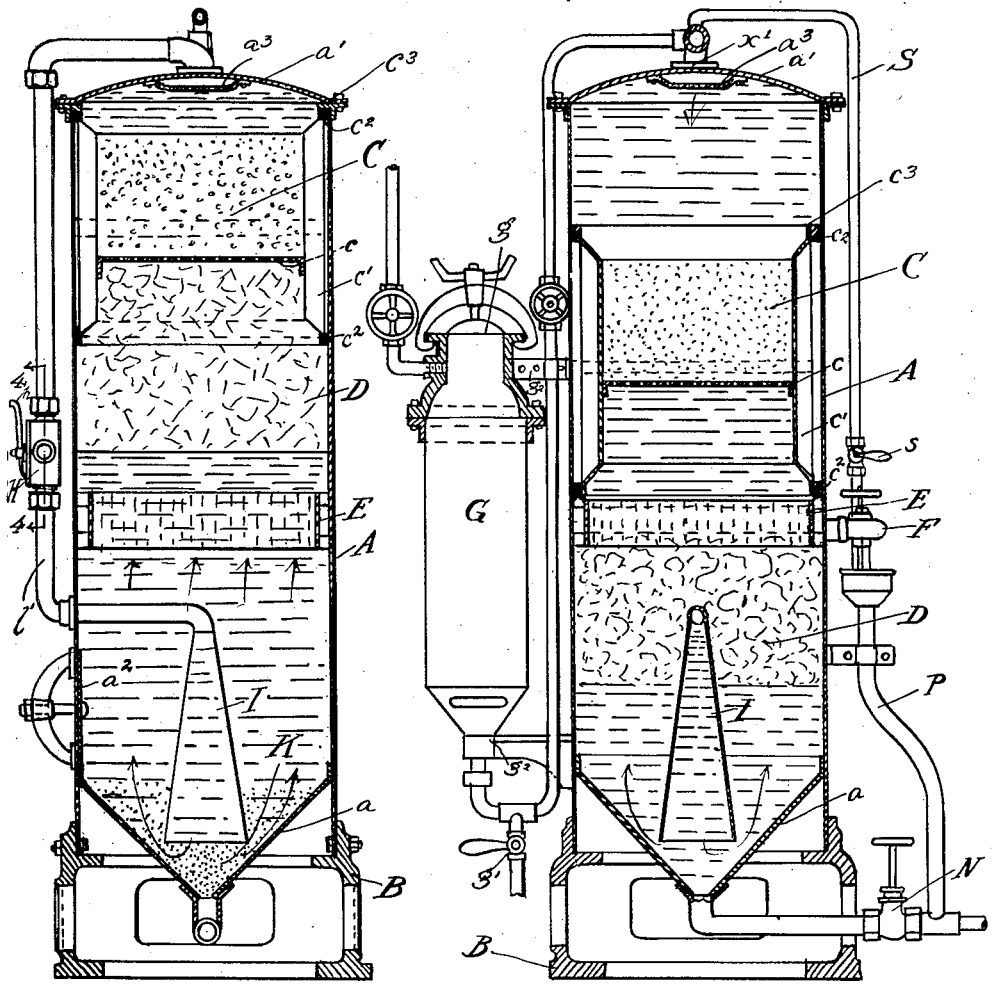
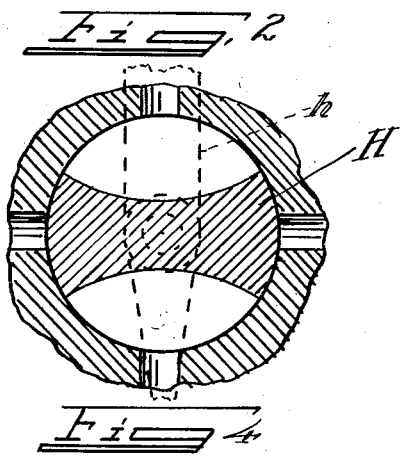
INVENTOR:
August Neumann
BY Walter A. Knight.
ATTORNEY.

Patented July 3, 1928.

1,675,860

UNITED STATES PATENT OFFICE.

AUGUST NEUMANN, OF REPPEN, GERMANY, ASSIGNOR, BY MESNE ASSIGNMENTS, TO THE PERMUTIT COMPANY, OF NEW YORK, N. Y., A CORPORATION OF DELAWARE.

APPARATUS FOR SOFTENING WATER.

Application filed December 20, 1923. Serial No. 681,687.

My invention relates to apparatus for the softening of water by taking advantage of the base exchanging properties of zeolites contained within the apparatus.

It is well known that zeolites or hydrated alumino-silicates both natural and synthetic, possess the property of softening hard water by means of their peculiar base exchanging properties, the calcium and magnesium in the hard water being exchanged for the sodium and potassium in the zeolites when the hard water is brought into contact with the zeolites. After a certain amount of water has been softened in this manner, the zeolites must be regenerated by means of a suitable salt such as a solution of sodium chloride, or potassium chloride, after which the operation of water softening may be again carried on. Generally the hard water passes downwardly thru the zeolite bed; to be softened; in this apparatus the water to be softened passes upwardly thru the zeolite bed.

Zeolites, (granular in form) are capable of mechanically filtering, as well as softening hard water, become packed by the force of the downwardly flowing water, and also become clogged by the accumulated mechanical impurities. In such water softening apparatus heretofore constructed it is necessary to frequently backwash the bed of zeolites so as to loosen the grains and carry away the mechanical impurities which accumulate on the zeolites. Backwashing is also used to expand and stir up the bed of zeolites, facilitating thorough regeneration and permitting rearrangement of the particles. This backwashing operation is accomplished by passing upwardly through the apparatus a quantity of water. A mechanical stirring device has sometimes been supplied to assist the water in loosening up the zeolite bed.

The principal object of my invention is to construct an efficient water softening apparatus that will not require backwashing and stirring of the zeolites and that will thereby save wash water, trouble and expense.

Another object of my invention is to construct an apparatus wherein the zeolite bed does not function as a mechanical filter and the water may be filtered and softened in such a manner that the mechanical impurities accumulated by a mechanical filtering medium will fall to the bottom of the casing by gravity and may be readily drained therefrom.

To attain these objects, I provide within the casing a filter bed of zeolites above and a bed of comminuted buoyant mechanical filtering material below.

When the water to be softened enters the casing it first contacts with the particles of comminuted buoyant filtering material causing them to rise in the casing, form a filter bed, and press against the under side of a screen plate, which may be the support for the bed of zeolites.

In the particular embodiment of my invention selected for illustration shown in the accompanying drawings, the zeolite bed support is vertically movable, and the buoyant particles composing the mechanical filter bed tend to press against the under side of said zeolite support, and assist in raising it.

Fig. 1, is a perspective of a complete pressure water softening apparatus showing the control valve in open position, Fig. 2, is a vertical axial section during water softening operation thru line 2—2 of Fig. 1, with the control valve shown in elevation in full lines, Fig. 3, is the same view of the apparatus as shown in Fig. 1 but during the zeolite regenerating and mechanical filter cleaning operations, with the casing in vertical axial section, and Fig. 4, a detail, is a vertical cross section on the line 4—4 of Fig. 2 showing valve H in closed position with handle $h$ broken away.

Referring now to the drawings, particularly Fig. 2. A vertical cylindrical casing A provided with coned bottom $a$ removable cover $a^1$ and a hand hole plate $a^2$, is supported by the base B. Within the casing is a bed of zeolites C supported on a perforated plate $c$ secured to a vertically movable cylindrical float $c^1$.

Packing and guiding rings $c^2$ are secured to the outside of the movable cylindrical float so as to prevent the passage of water between the float $c^1$ and the casing A.

D indicates a cork filter bed forming a mechanical filter below the perforated plate $c$, the operation of which bed will later be more fully described.

Obviously, the float may be made buoyant enough to alone carry the zeolite bed or so that both float and cork layer would operate together, or the vertically adjustable cylinder may not include a float, and the cork alone be used to raise the zeolite bed.

An annular strainer member E secured to the inner side of the casing, acts as a stop for the float $c^1$ (see Fig. 3) and also shields the brine withdrawal valve F from particles of cork which would otherwise pass into it.

A brine tank G provided with removable top $g$ and drain valve $g^1$ is secured to casing A by brackets $g^2$ $g^2$ and is adapted to contain salt or the like for regenerating the zeolites when exhausted.

A valve H provided with operating lever $h$ controls the flow of water thru the apparatus.

Assuming the apparatus empty of water, all the valves and pet cocks in the apparatus shut, the apparatus not in use, but the zeolites regenerated and in condition for use, and that it is desired to filter and soften water, the operation is as follows:

Open valves $h^1$ controlling the inflow of hard water, and $h^2$ controlling the outflow of soft water; turn lever $h$ to the position shown in Fig. 1, whereupon water under pressure enters the lower part of the casing A at $x$ thru pipes L, $l$ and $l^1$. A bell shaped discharge I is secured to pipe $l^1$ within the casing and conveys the incoming hard water to the bottom of the casing where it contacts with the particles of cork, which rise in the casing until they reach the perforated plate $c$, form a fairly compact mechanical filter bed, through which the water passes upwardly and is relieved of matter in suspension. The rising cork assists in raising the float $c^1$ with plate $c$ and superimposed zeolite filter bed C, until the top rim $c^3$ of the float contacts with the cover $a^1$ as shown in Fig. 2. The water then continues up thru the bed of zeolites C where it is softened, passes thru the screen $a^3$ and leaves the casing thru the top at $x^1$ returning thru pipe M and valve H and thence to a soft water supply tank (not shown) thru the pipes $m$, $m^1$ $m^2$ (Fig. 1). Upwardly flowing water through the unconfined zeolite bed keeps it expanded, maintains its maximum efficiency, facilitates complete regeneration and makes backwashing unnecessary.

During the passing of the hard water thru the casing A the mechanical impurities K in the water are arrested by the cork bed, and as they accumulate fall by gravity to the bottom of the casing.

Prior to regenerating the zeolites the control valve H is closed as shown in Fig. 4; valve F is opened to allow water in the system to escape, and permit the float $c^1$ and the bed of zeolites to fall quickly to its lower position as shown in Fig. 3. The mechanical impurities that have collected in the bottom of the casing may be simultaneously withdrawn by momentarily opening the valve N which should be again closed before inserting salt solution into the casing.

When the inflow of hard water is shut off and the casing drained, the float $c^1$ with foraminous support $c$, and zeolite bed C returns to its lower position. If the float is so proportioned as to require the combined bouyancy of the float, lifting power of the cork and force of the upwardly flowing water to raise the float when carrying the zeolite bed, it will fall whenever the flow of water is cut off.

Coming now to the regenerating operation. Valve $h^2$ is closed, valve $h^3$ controlling the flow of water into the brine tank, and $h^4$ controlling the flow of brine from the brine tank, are opened to permit water from the pipe L to enter the tank G containing common salt or other vivifying agent and to permit brine to pass out through pipe O into the top of the casing A. At the same time control valve H may be opened to permit hard water to flow into the system by way of pipes L, $l$ and $l^1$ to wash dirt from the particles of cork or other buoyant filter material and also to wash out the brine, both brine and hard water simultaneously leaving casing A thru valve F. Pipe P is provided to carry away the waste brine and water. After the zeolites have been regenerated and washed free of excess brine, the water may be again softened as before described.

A vent pipe S provided with valve $s$ permits the escape of air from the system when the softening operations are commenced.

While I have described my preferred method I do not wish to be limited to the exact construction as shown but claim as within the scope of my invention all forms readable upon the claims that will be finally allowed on this application.

I claim as my invention and desire to secure by Letters Patent of the United States:

1. A water softening apparatus comprising a casing, a separate loose lying mechanical filter bed of comminuted buoyant material therein, a loose lying zeolite filter bed above said mechanical filter, said zeolite bed resting on a perforated support and means for passing the water to be treated upwardly through said beds.

2. A water softening apparatus comprising a casing, a separate mechanical filter bed of comminuted buoyant material therein, an unconfined zeolite filter bed above said mechanical filter, said zeolite bed resting on a perforated support, means for passing the water to be treated upwardly through said beds, and means for withdrawing the mechanically arrested impurities from the bottom of the casing.

3. In an apparatus for the softening of water, the combination of a casing, a foraminous support vertically movable within said casing, a bed of zeolite upon said foraminous support, and a layer of comminuted buoyant filtering material beneath said foraminous support tending to buoy said support and zeolites on the passage of water upwardly thru said casing.

4. In an apparatus for the softening of water, the combination of a casing, a vertically movable float within said casing, a bed of zeolites sustained by said float, and a loose bed of comminuted buoyant filtering material below said float.

5. In an apparatus for the softening of water the combination of a casing, a vertically movable float within said casing, a bed of zeolites carried by and movable with said float, a mechanical filter below said float, means for limiting the movement of said float lengthwise of said casing, and means for withdrawing from the bottom of the casing, the impurities arrested by said mechanical filter.

6. In an apparatus for softening water by passing the water to be treated upwardly therethrough, the combination of a casing, an unconfined mechanical filter bed composed of comminuted buoyant material and a superimposed bed of zeolites within said casing and means for simultaneously regenerating said zeolites and washing said mechanical filter bed.

In testimony whereof I have hereunto set my hand.

AUGUST NEUMANN.